(12) United States Patent
Kirsch (10) Patent No.: US 6,981,012 B2
(45) Date of Patent: Dec. 27, 2005

(54) METHOD AND CIRCUIT FOR NORMALIZATION OF FLOATING POINT SIGNIFICANTS IN A SIMD ARRAY MPP

(75) Inventor: Graham Kirsch, Hants (GB)

(73) Assignee: Micron Technology, Inc., Boise, ID (US)

( * ) Notice: Subject to any disclaimer, the term of this patent is extended or adjusted under 35 U.S.C. 154(b) by 631 days.

(21) Appl. No.: 09/874,044

(22) Filed: Jun. 6, 2001

(65) Prior Publication Data

US 2002/0198916 A1    Dec. 26, 2002

(30) Foreign Application Priority Data

May 21, 2001  (GB) .................................... 0112275

(51) Int. Cl.[7] .............................. G06F 7/38; G06F 7/00
(52) U.S. Cl. ...................................... 708/496; 708/205
(58) Field of Search ............................... 708/204–205, 708/209, 495, 496, 499

(56) References Cited

U.S. PATENT DOCUMENTS

| 5,764,549 | A | | 6/1998 | Bjorksten et al. | |
|---|---|---|---|---|---|
| 5,771,183 | A | * | 6/1998 | Makineni | 708/205 |
| 5,831,884 | A | * | 11/1998 | Suzuki | 708/505 |
| 6,175,847 | B1 | | 1/2001 | Brooks et al. | |
| 6,178,437 | B1 | * | 1/2001 | Dhong et al. | 708/505 |
| 6,499,044 | B1 | * | 12/2002 | Brooks et al. | 708/211 |
| 6,557,021 | B1 | * | 4/2003 | Brooks et al. | 708/496 |

* cited by examiner

Primary Examiner—Tan V. Mai
(74) Attorney, Agent, or Firm—Dickstein Shapiro Morin & Oshinsky LLP

(57) ABSTRACT

The processing elements if a single instruction multiple data (SIMD) massively parallel processor (MPP) are provided with two register blocks. One register block includes logic for performing limited left shifting, while the other register block includes logic for performing limited right shifting. A method is disclosed for using the registers blocks with their associated logic to perform floating point significand alignment and normalization. The limited shifting logic occupies less die space than a full feature barrel shifter, thereby permitting a greater number of processing elements.

39 Claims, 5 Drawing Sheets

METHOD AND CIRCUIT FOR NORMALIZATION OF FLOATING POINT SIGNIFICANTS IN A SIMD ARRAY MPP

FIELD OF THE INVENTION

The present invention relates to the field of massively parallel processing systems, and more particularly to a method and apparatus for efficiently normalizing and aligning the significand portion of a floating point number in a single instruction multi data massively parallel processing system.

BACKGROUND OF THE INVENTION

The following application is related to application Ser. No. 09/874,307 filed on Jun. 6, 2001 (now allowed) entitled "Method and Circuit for Alignment of Floating Point Significants in a SIMD Array MPP," the disclosure of which is incorporated by reference.

Figure 1:
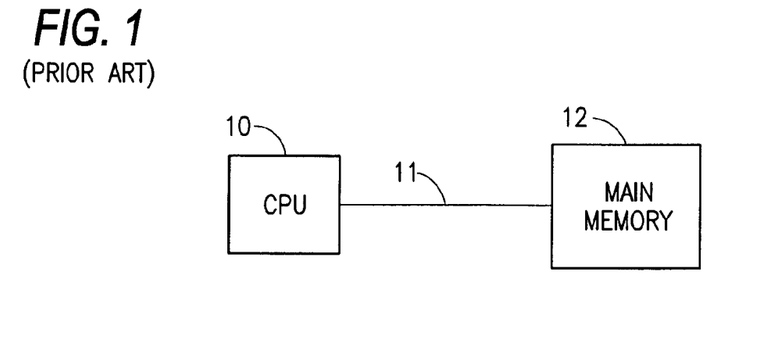
FIG. 1 is a block diagram of a prior art von Neumann architecture computer system.

The fundamental architecture used by all personal computers (PCs) and workstations is generally known as the von Neumann architecture, illustrated in block diagram form in FIG. 1. In the von Neumann architecture, a main central processing unit (CPU) 10 is coupled via a system bus 11 to a memory 12. The memory 12, referred to herein as "main memory", also contains the data on which the CPU 10 operates. In modern computer systems, a hierarchy of cache memories is usually built into the system to reduce the amount of traffic between the CPU 10 and the main memory 12.

The von Neumann approach is adequate for low to medium performance applications, particularly when some system functions can be accelerated by special purpose hardware (e.g., 3D graphics accelerator, digital signal processor (DSP), video encoder or decoder, audio or music processor, etc.). However, the approach of adding accelerator hardware is limited by the bandwidth of the link from the CPU/memory part of the system to the accelerator. The approach may be further limited if the bandwidth is shared by more than one accelerator. Thus, the processing demands of large data sets are not served well by the von Neumann architecture. Similarly, as the processing becomes more complex and the data larger, the processing demands may not be met even with the conventional accelerator approach.

Figure 2:
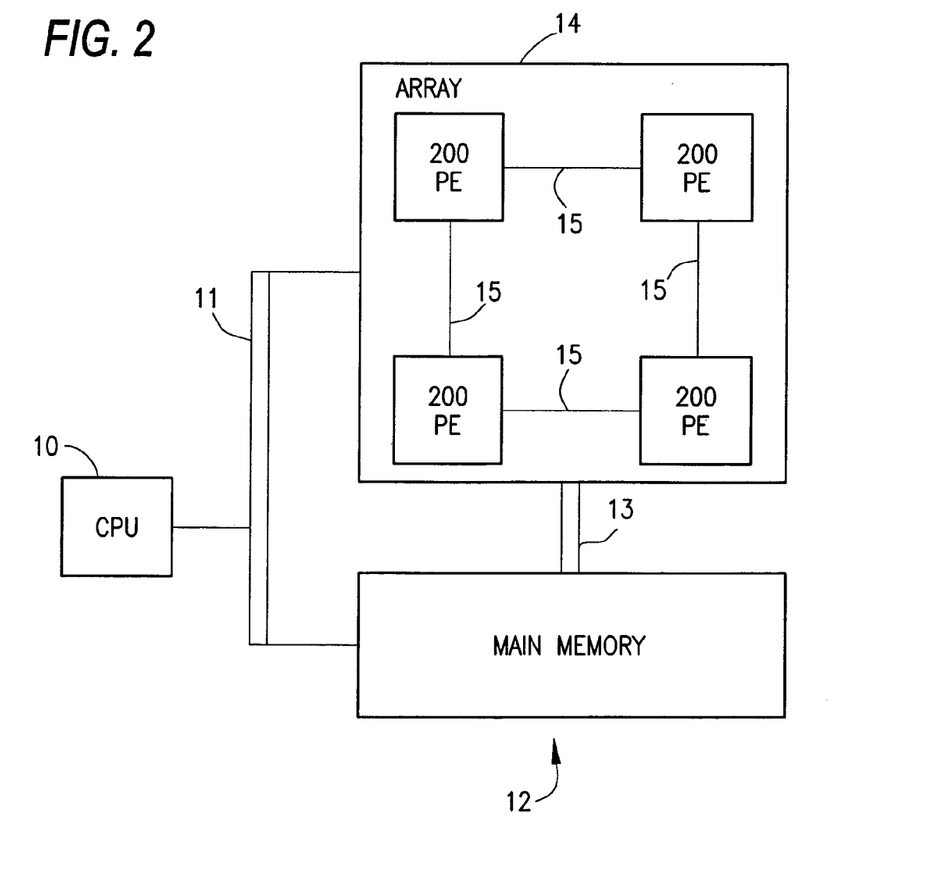
FIG. 2 is a block diagram of a SIMD MPP computer system.

Referring now to FIG. 2, an alternative to the von Neumann architecture is the single instruction multiple data (SIMD) massively parallel processor (MPP) system. A MPP system differs from a von Neumann system by using a large number of processors, called processing elements (PE) 200, coupled to a communications network 15. The communications network 15 permit each PE 200 to exchange data with other PEs 200. Additionally, the PEs 200 may read or write to main memory 12 via an array-to-memory bus 13, or receive commands or instructions from CPU 10 via bus 11. Although the CPU 10 may perform some processing, in a SIMD MPP system, the array of PEs 14, comprising the PEs 200 and its communications network 15, perform most of the computations. The CPU 10 functions in a supporting role.

In a SIMD MPP, each PE operates on the same instruction, at the same time, but on different pieces of data. Since the PEs in a SIMD array operate in lockstep, data dependent conditional operations cannot be performed by branching, as would be done in a conventional processor. Instead, each PE can decide whether to store the result of an operation either in an internal register or in a memory dependent upon a condition generated within the PE from data local to the PE. This technique is known as "activity control" and is a very powerful method for performing data dependent decisions in a parallel computer which operates on a single stream of instructions.

Most SIMD MPPs utilize relatively simple processors for PEs 200. For example, short integer PEs 200, such as 8-bit integer processors may be used. SIMD MPPs utilize these simple processors in order to increase the number of PEs 200 which can be integrated upon a single silicon die. High performance is achieved by the use of a large number of simple PEs 200, each operating at a high clock speed.

The use of short integer PEs 200 mean that floating point operations may require several clock cycles to complete. In many computer systems, floating point numbers are often stored in a manner consistent with the IEEE-754 standard. In particular, the IEEE-754 standard stores single precision floating point number as three binary fields taking the format of:

$$(-1)^s \times 2^{(e-127)} \times (1.f) \qquad (1)$$

wherein:
s is a single bit representing the sign of the floating point number.
e is an 8-bit unsigned integer representing a biased exponent. e is said to represent a biased exponent because the actual exponent being represented is equal to e−127. Although an 8-bit unsigned integer may range from 0–255, and thereby permitting exponents in the range from −127 (i.e., −127=0−127) to +128 (i.e., 128=255−127), the IEEE-754 standard limits the range of usable exponents to exclude −127 and +128.
1.f is a 24-bit significant field in a "normalized" format, i.e., a bit field in which the most significant bit (MSB) is the first digit left of the binary point and in which the most significant bit is set to one. Since the most significant bit of a normalized number is understood to be 1, there is no need to store the most significant bit.

Data which have biased exponents of 0 and 255 are used to represent special conditions and the number zero. The IEEE-754 standard represents the number zero using a biased exponent of 0 (i.e., for the single precision format, the exponent equals −127) and a significand field of 00000000000000000000000$_2$. (In the special cases of zero and non-normalized numbers, indicated by the exponent being 0, the most significant bit of the significand is not taken to be a 1.)

Under the IEEE-754 standard, single extended, double, and double extended precision numbers are stored in similar format, albeit using different sized exponents and significands. For example, double precision numbers use a 10-bit biased exponent field with representable exponents ranging from −1022 to 1023 and a significand having 53 bits.

In order to perform arithmetic operations on floating point number stored in the IEEE-754 format, the floating point numbers first need to be separated, or "demerged", to extract the sign bit, the exponent, and the significand. Once these fields have been extracted, they can be operated upon in order to perform the arithmetic operation. For example, multiplying two floating point number includes multiplying the significands and adding the exponents. Once the arithmetic operation has been performed, significand field of the result may not be in a normalized format. For example, multiplication of two operands with normalized significands results in an answer ranging from $0_2$ to $100_2$. The process of returning a significand field back to a normalized format is known as normalization.

In conventional computer systems, normalization is normally performed using standard shifting logic, such as barrel shifters. Shifting logic is used in conventional computer systems because they have adequate speed and they do not consume a significant amount of silicon real estate in comparison to the other circuitry in a complex CPU 10. However, in a SIMD MPP using simple PEs 200, standard shifting logic such as barrel shifters would significantly increase the size of the PEs 200 and also be too slow. Accordingly, there is a desire and need for a way to efficiently perform normalization of floating point significands in a SIMD MPP environment.

SUMMARY OF THE INVENTION

The present invention is directed at a processing element of a SIMD MPP which can efficiently perform the normalization processes commonly used when performing arithmetic operations on floating point numbers. The PEs of the SIMD MPP include two groups of registers. One of the groups is known as the M block and includes a plurality of registers and logic which permits limited right shifting of the contents of the registers. The other group of registers is known as the Q block and includes a plurality of registers and logic which permits limited left shifting (e.g., 1-, 2-, 4-, and 8-bit left shifts are supported) of the contents of the registers. A method is used with the limited left shifting ability of the Q block registers to normalize the result of an arithmetic calculation.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF THE INVENTION

Figure 3:
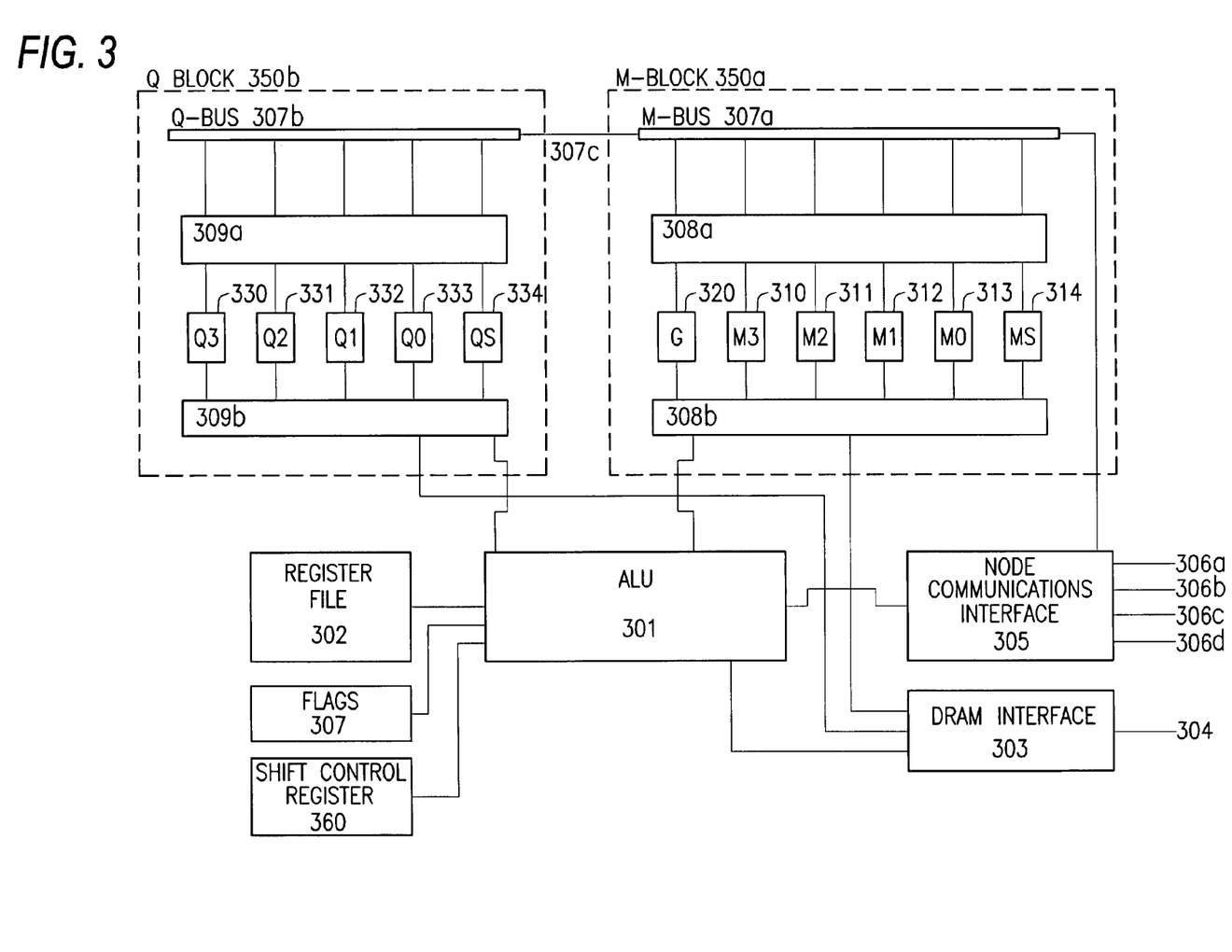
FIG. 3 is a block diagram of one of the PEs in the SIMD MPP computer system in accordance with the principles of the present invention.
Figure 4A:
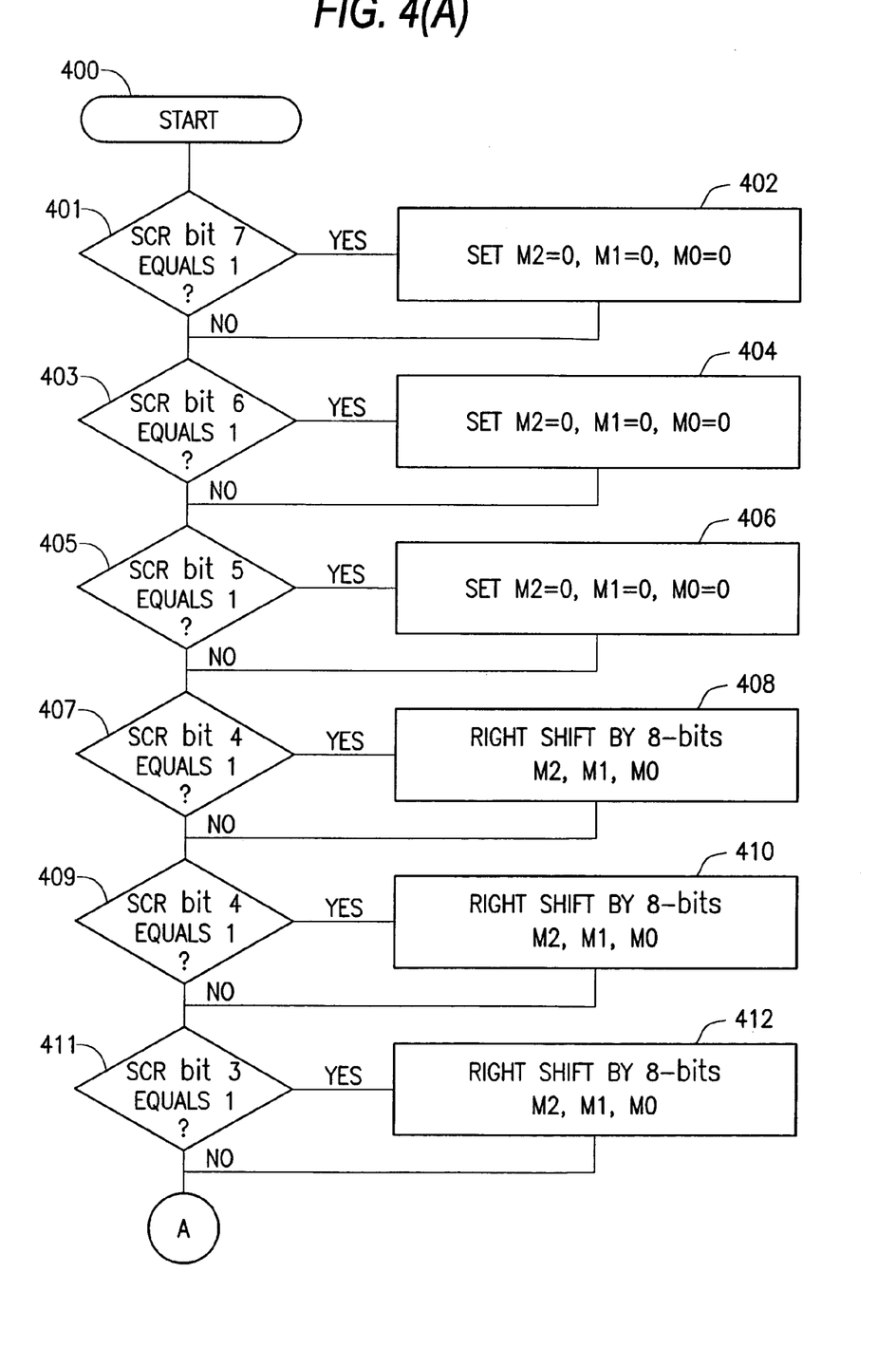
FIGS. 4A and 4B are a flow chart which illustrate how the PE of the present invention aligns significand data.
Figure 4B:
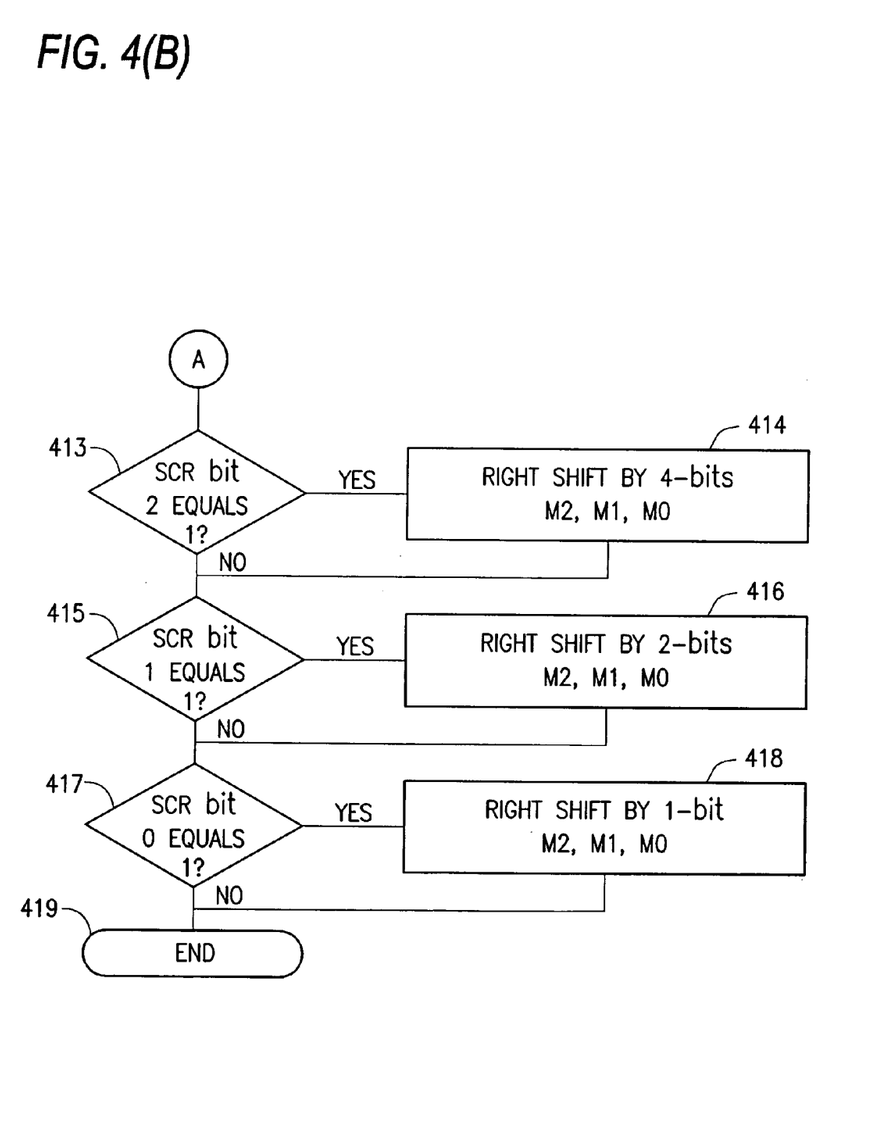

Now referring to the drawings, where like reference numerals designate like elements, there is shown in FIG. 3 a block diagram of a PE 200 in accordance with the principles of the present invention. The PE 200 is divided into several functional blocks, including an ALU 301, which is coupled to a Node Communications Interface 305 and a DRAM Interface 303. The Node Communications Interface 305 is used by the PE 200 to send and receive messages to the four other PE 200 adjacent to the present PE 200, over signal lines 306a, 306b, 306c, and 306d. The DRAM Interface 303 is used by the PE 200 to read and write to a main memory 12. The ALU 301 is also coupled to a series of registers, including a register file 302 used to store data, a series of flag registers 307, and a shift control register ("SCR") 360. In the exemplary embodiment, the SCR 360 is an 8-bit register with the most significant bit designated bit 7 and the least significant bit designated bit 0. The function of the flag registers 307 and the SCR 360 will be explained later. The PE 200 also includes two registers blocks, namely the M Block 350a and the Q Block 350b.

The M block 350a includes a bus called the M Bus 307a which is coupled to the Node Communications Interface 305. The M bus 307a is also coupled, via logic circuit 308a to a plurality of registers. These registers include the M3 310, M2 311, M1 312, M0 313, and MS 314 registers. In some embodiments an optional a G register 320 may also be present. The G register 320 may be used, for example, to store extension bits for use in higher precision calculations. In one exemplary embodiment, registers M3, 310, M2, 311, M1 312, and M0 313 are 8-bit registers while register MS 314 is a single bit register. Logic circuit 308b couples registers M3 310, M2 311, M1 312, M0 313, MS 314, and G 320 to Q Bus 307b, ALU 301 and DRAM Interface 304. The logic circuits 308a and 308b represent conventional logic circuits such as a network of multiplexers, which permit the registers M3 310, M2 311, M1 312, M0 313, MS 314, and G 320 to receive and transmit data in a manner which will be described in additional detail.

Additionally, logic circuits 308a, 308b are also capable of demerging an IEEE-754 formatted number into its sign, biased exponent, and significand fields. In particular, the sign is stored in register MS 314, the biased exponent is stored in M3 310, and the significand is stored in registers M2 311 (most significant byte), M1 312, and M0 313 (least significant byte). The logic circuits 308a, 308b may also be capable of setting registers M2 311, M1 312, and M0 313 to zero. Finally, logic circuits 308a, 308b also permit data stored in registers M2 311 and M1 312 to be right shifted in increments of 1, 2, 4, and 8 bits. The M registers (i.e., MS 314, M0 313, M1 312, M2 311, and M3 310) and the Q registers (i.e., QS 334, Q0 333, Q1 332, Q2 331, and Q3 330) are coupled via signal line 307c. This permits the contents of the M registers to be transferred in one clock cycle to corresponding Q registers in the Q block.

The Q block 350b is similar to the M block 350a. The Q block has an bus known as the Q bus 307b. The Q bus 307b is not coupled to the Node Communications Interface 305. Instead, the Q bus 307b is coupled via signal line 307c to the M Bus 307a of the M block 350a. The Q block 350b include a series of Q registers, namely QS 334, Q0 333, Q1 332, Q2 331, and Q3 330. In the exemplary embodiment register QS is a single bit register while registers Q0 333, Q1 332, Q2 331, and Q3 330 are 8-bit registers. The Q block 350b has logic circuits 309a, 309b which function in a manner similar to logic circuits 308a, 308b of the M block 350a. One significant difference between the two sets of logic circuits, 308a/308b and 309a/309b, however, is that while logic circuits 308a, 308b permit data stored in registers M2 and M1 to be right shifted in 1, 2, 4, and 8 bit increments, logic circuits 309a, 309b permit data in registers Q2 331 and Q1 332 to be left shifted, in the same increments.

The PE 200 also includes a flag register 307 which contain a plurality of flags. These flags default to being set to zero, unless a specific conditions resets them to one. In the exemplary embodiment there are four flags named Q2Z8, Q2Z4, Q2Z2, and Q2Z1, which function as described below. Flag Q2Z8 is one if all eight bits of register Q2 331 are zero. Flag Q2Z4 is one if the four most significant bits of register Q2 331 are zero. Flag Q2Z2 is one if the two most significant bits of register Q2 331 are both zero. Finally, flag Q2Z1 is one if the most significant bit of register Q2 331 is zero.

The PE 200 performs floating point arithmetic operations by first demerging the two IEEE-754 formatted operands. This is done by loading the first operand into the M block 350a. The operand may be loaded from the Node Communications Interface 305 if the operand is sent from an adjacent PE 200. Alternatively, the operand may be loaded from the DRAM Interface 303 if the operand had been loaded into the main memory 12. As mentioned previously, the logic circuits 308a, 308b in M block 350 demerge an IEEE-754 formatted operand into its sign, biased exponent, and significand fields by storing the sign field in register MS 314, the biased exponent in register M3 310, and the significand in registers M2 311 and M1 312. Once the first operand has been demerged, it is transferred via signal line 307c to the Q block 350b. The second operand is then loaded to the M block 350a and demerged. At this point, the two demerged successive operands are in the M block 350a and the Q block 350b.

The ALU 301, which is coupled to the M block 350a via logic circuit 308b and the Q block 350b via logic circuit 309b, is used to perform the arithmetic operation in an ordinary manner. For example, the significands may be added, subtracted, or multiplied. For addition and subtraction the exponents of the operands are equal and do not require adjustment. For multiplication, the exponents are summed. The result of the arithmetic operation are stored in the Q block 350b. As usual, the most significant byte of the result is stored in register Q2, and lesser significant bytes of the results are progressively stored in registers Q1 and Q0. If there are additional bits of the result which needs storing, the lesser significant bytes of the results may be stored in the G register 320 (if present) and the M0 register 313 of the M Block 350, and additional lesser significant bytes of the results may be stored in the register file.

After performing the arithmetic operation, the significand may not be in normalized form. In order to comply with the IEEE-754 standard, the significand stored in the plurality of Q registers Q2 331 Q1 332 Q0 333 may need normalization. In general, the result of an arithmetic operation may result in a significand having a number of zeros (up to the level of precision, i.e., up to 24 for IEEE-754 single precision arithmetic) at the most significant portion of the significand. The normalization process shifts the significand so that the most significant bit (i.e., bit 7 of register Q2 331) is a one.

Figure 5:
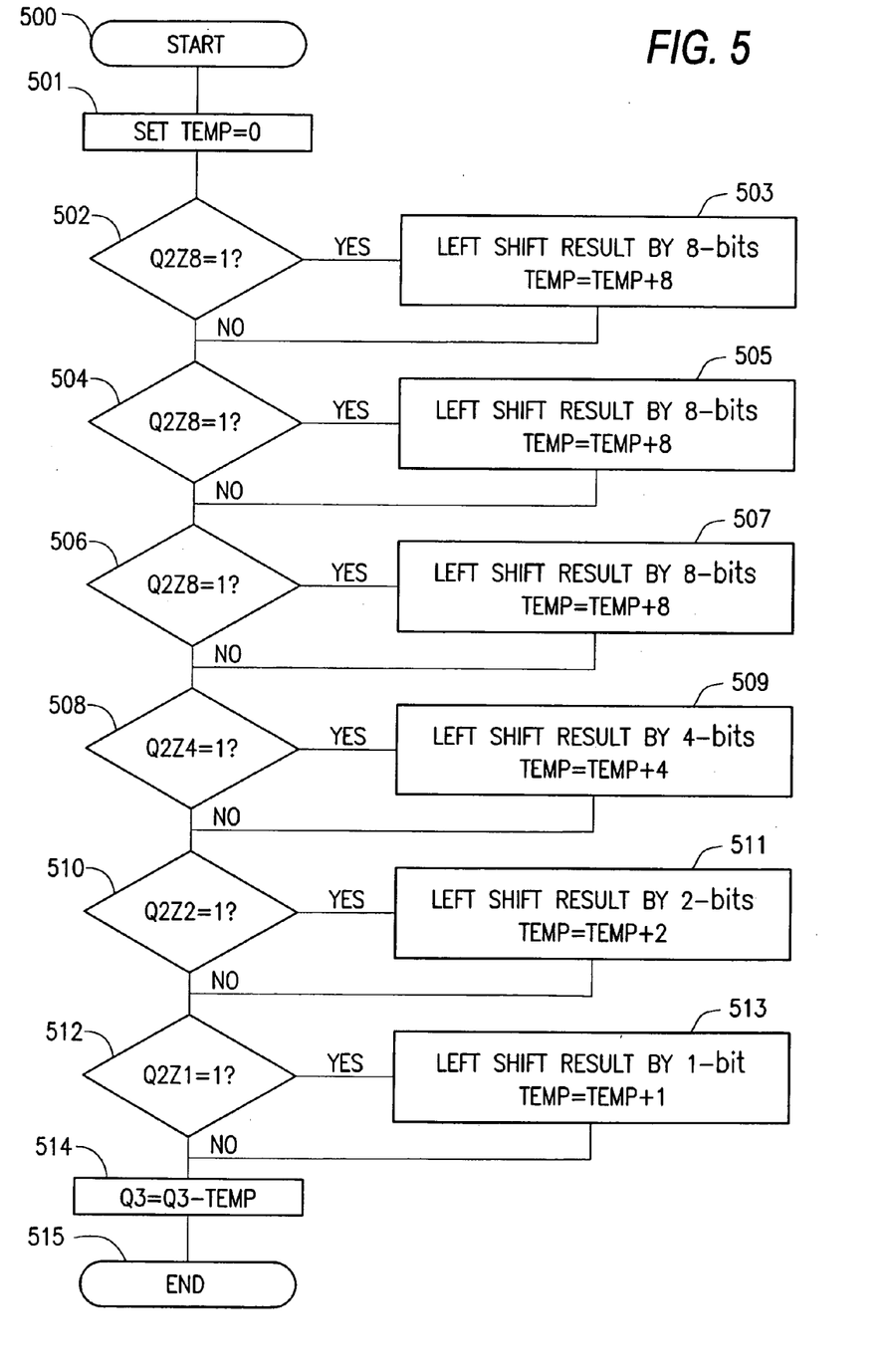
FIG. 5 is a flowchart which illustrates how the PE of the present invention normalizes significand data.

The normalization of the significand is performed according to the 7 steps described below and illustrated in FIG. 5, steps 500–515:

(Step 1) Set a temporary variable, such as one of the registers in the register file 302 to zero (FIG. 5, 501).

(Step 2) If flag Q2Z8 is equal to one (FIG. 5, 502), shift the result to the left by eight bits and add 8 to the temporary variable (FIG. 5, 503).

(Step 3) If flag Q2Z8 is equal to one (FIG. 5, 504), left shift the result by 8-bits and add 8 to the temporary variable (FIG. 5, 505).

(Step 4) If flag Q2Z8 is equal to one (FIG. 5, 506), left shift the result by 8-bits and add 8 to the temporary variable (FIG. 5, 507).

(Step 5) If flag Q2Z4 is equal to one (FIG. 5, 508), left shift the result by 4-bits and add 4 to the temporary variable (FIG. 5, 509).

(Step 6) If flag Q2Z2 is equal to one (FIG. 5, 510), left shift the result by 2-bits and add 2 to the temporary variable (FIG. 5, 511).

(Step 7) If flag Q2Z1 is equal to one (FIG. 5, 512), left shift the result by 1-bits and add 1 to the temporary variable (FIG. 5, 513).

(Step 8) The exponent of the result is adjusted by subtracting the temporary variable from the exponent. I.e., Q3=Q3–temporary variable (FIG. 5, 514).

Note that as the shifting is performed in the Q registers Q2 331 Q1 332 Q0 333, the contents of the G register 320 is being shifted into register Q0. Likewise the contents of the M0 313 register is being shifted into register G 320.

For example, suppose in one of the PEs 200 of the array 14, the Q Block 350b registers (Q3 330, Q2 331, Q1 332, and Q0 333) contain the following values:

| Q3 | Q2 | Q1 | Q2 |
|---|---|---|---|
| 0000 1000 | 0001 0101 | 1001 1001 | 0000 1111 |

Normalization is performed as follows: In step (1), a temporary variable is set to zero. The temporary variable may be a register from the register file 302, a memory location accessed via the DRAM Interface 304, or any other temporary storage location. The content of the registers, flags, and temporary variable after step (1) are as follows:

| Q3 | Q2 | Q1 | Q0 |
|---|---|---|---|
| 0000 1000 | 0001 0101 | 1001 1001 | 0000 1111 |
| Q2Z8 | Q2Z4 | Q2Z2 | Q2Z1 | Temp |
| 0 | 0 | 1 | 1 | 0 |

In step (2) since flag Q2Z8 is equal to zero so no further processing is performed in step (2). The content of the registers, flags, and temporary variable after step (2) are as follows:

| Q3 | Q2 | Q1 | Q0 |
|---|---|---|---|
| 0000 1000 | 0001 0101 | 1001 1001 | 0000 1111 |
| Q2Z8 | Q2Z4 | Q2Z2 | Q2Z1 | Temp |
| 0 | 0 | 1 | 1 | 0 |

In step (3) since flag Q2Z8 is equal to zero, no further processing is performed in step (3). The content of the registers, flags, and temporary variable after step (3) are as follows:

| Q3 | Q2 | Q1 | Q0 |
|---|---|---|---|
| 0000 1000 | 0001 0101 | 1001 1001 | 0000 1111 |
| Q2Z8 | Q2Z4 | Q2Z2 | Q2Z1 | Temp |
| 0 | 0 | 1 | 1 | 0 |

In step (4), since flag Q2Z8 is equal to zero, no further processing is performed in step (4). The content of the registers, flags, and temporary variable after step (4) are as follows:

| Q3 | Q2 | Q1 | Q0 |
|---|---|---|---|
| 0000 1000 | 0001 0101 | 1001 1001 | 0000 1111 |
| Q2Z8 | Q2Z4 | Q2Z2 | Q2Z1 | Temp |
| 0 | 0 | 1 | 1 | 0 |

In step (5), since flag Q2Z4 is equal to zero, no further processing is performed in step (5). The content of the registers, flags, and temporary variable after step (5) are as follows:

| Q3 | Q2 | Q1 | Q0 |
|---|---|---|---|
| 0000 1000 | 0001 0101 | 1001 1001 | 0000 1111 |
| Q2Z8 | Q2Z4 | Q2Z2 | Q2Z1 | Temp |
| 0 | 0 | 1 | 1 | 0 |

In step (6), since flag Q2Z2 is equal to one, the content of registers Q2, Q1, and Q0 are right shifted by 2-bits, and 2 is added to the temporary variable. The content of the registers, flags, and temporary variable after step (6) are as follows:

| Q3 | Q2 | Q1 | Q0 |
|---|---|---|---|
| 0000 1000 | 0101 0110 | 0110 0100 | 0011 1100 |
| Q2Z8 | Q2Z4 | Q2Z2 | Q2Z1 | Temp |
| 0 | 0 | 0 | 1 | 2 |

In step (7), since flag Q2Z1 is one, the content of registers Q2, Q1, and Q0 are right shifted by 1-bit, and 1 is added to the temporary variable. The content of the registers, flags, and temporary variable after step (7) are as follows:

| Q3 | Q2 | Q1 | Q0 |
|---|---|---|---|
| 0000 1000 | 1010 1100 | 1100 1000 | 0111 1000 |
| Q2Z8 | Q2Z4 | Q2Z2 | Q2Z1 | Temp |
| 0 | 0 | 0 | 0 | 3 |

In step (8), the contents of the temporary variable (now 3) is subtracted from the exponent (which is held in register Q3). The contents of the Q registers are now normalized and the state of the registers, flags, and temporary variable (at this point the temporary variable is no longer needed and may be used for other purposes) are as follows:

| Q3 | Q2 | Q1 | Q0 |
|---|---|---|---|
| 0000 0101 | 1010 1100 | 1100 1000 | 0111 1000 |
| Q2Z8 | Q2Z4 | Q2Z2 | Q2Z1 | Temp |
| 0 | 0 | 0 | 0 | 3 |

Thus, the present invention provides an apparatus and a method for normalizing the significand portion of an floating point number, such as those which follow the IEEE-754 floating point standard, in a SIMD MPP environment. The present invention is advantageous in that each PE 200 of the array 14 is not required to have a full feature shifter, such as a barrel shifter. Instead, a faster but more limited shifting logic, such as logic circuits 308*a*, 308*b*, which are only capable of shifting the significand data by 1-, 2-, 4-, or 8-bits are used in combination with a shift control register 360, under a nine step procedure to align the significand. Ideally, the instruction or instructions which correspond to each of the nine steps can be executed by a PE 200 in a single clock cycle. Since in a SIMD environment each PE 200 in the array 14 executes the same instruction at the same time, every significand in the array 14 can be aligned in as little as nine clock cycles.

Although the invention has been discussed and illustrated in the context of a 8-bit shift control register and shifting circuits which are capable of shifting significand data by 1-, 2-, 4-, and 8-bits, the invention is not so limited and may be generalized as follows: The flexibility of the left shifting circuitry and the number of flags may be varied. The number of flags and the flexibility of the left shifting circuitry is related as follows: If there are F+1 flags (wherein F is an integer of at least 3), then the left shifting circuitry should be capable of left shifting the significant being normalized by $2^0, 2^1, 2^2, \ldots,$ or $2^F$ bits.

The generalized normalization procedure begins with the arithmetic logic unit setting to zero the value of a temporary storage location. Each flag is then examined, beginning with flag F and ending with flag 0. For each flag which is equal to one, the arithmetic logic unit causes the left shifting circuitry to left shift the significand by $2^F$ bits and add $2^F$ to the value stored in the temporary storage location. After every flag has been analyzed, the value stored in the temporary register is subtracted from the significand's exponent.

While certain embodiments of the invention have been described and illustrated above, the invention is not limited to these specific embodiments as numerous modifications, changes and substitutions of equivalent elements can be made without departing from the spirit and scope of the invention. Accordingly, the scope of the present invention is not to be considered as limited by the specifics of the particular structures which have been described and illustrated, but is only limited by the scope of the appended claims.

What is claimed as new and desired to be protected by Letters Patent of the United States is:

1. A circuit having support for normalization of significants comprising:
    a first register block, said first register block including at least one first register for holding a first exponent and a first significant of a first floating point number and a first logic capable of left shifting the significant of the first floating point number;
    a second register block, said second register block including at least one second register for holding a second exponent and a second significant of a second floating point number;
    a plurality of flags, each of said plurality of flags having a state based on the contents of said first significant;
    an arithmetic logic unit coupled to said first register block, said second register block, and said plurality of flags, said arithmetic logic unit causing the first logic to left shift the first significant based upon the states of said plurality of flags.

2. The circuit of claim 1, wherein said plurality of flags further comprises:
an $I^{th}$ flag, wherein I is a non-negative integer, said $I^{th}$ flag which is set to a first sate when the $2^I$ most significant bits of said first significant are each zeros and a second state if any of the $2^I$ most significant bits is non-zero.

3. The circuit of claim 2, wherein said arithmetic logic unit causes said first logic to left shift by $2^I$ bits the first significant if said $I^{th}$ flag is set to the first state.

4. The circuit of claim 3, wherein said arithmetic logic unit is coupled to a temporary storage location for storing an adjustment to be subtracted from said first exponent, and increments said adjustment by $2^I$ if said first flag is set to the first state.

5. The circuit of claim 2, wherein I is 0.

6. The circuit of claim 2, wherein I is 1.

7. The circuit of claim 2, wherein I is 2.

8. The circuit of claim 2, wherein I is 3.

9. The circuit of claim 1, wherein said arithmetic logic unit is coupled to a temporary storage location.

10. The circuit of claim 9, wherein said temporary storage location is a register in a register file.

11. The circuit of claim 9, wherein said temporary storage location is a main memory accessed through a memory interface.

12. The circuit of claim 1, wherein:
said plurality of flags further comprises,
an $I^{th}$ flag, wherein I is a positive integer of at least 3, which is set to a first state when the $2^I$ most significant bits of said first significant are each zeros and a second state if any of the $2^I$ most significant bits of said first significant is non-zero;
an $(I-1)^{th}$ flag which is set to a first state when the $2^{(I-1)}$ most significant bits of said first significant are each zeros and a second state if any of the $2^{(I-1)}$ most significant bits of said first significant is non-zero;
an $(I-2)^{th}$ flag which is set to a first state when the $2^{(I-2)}$ most significant bits of said first significant are each zeros and a second state if any of the $2^{(I-2)}$ most significant bits of said first significant is non-zero; and
an $(I-3)^{th}$ flag which is set to a first state when the $2^{(I-3)}$ most significant bits of said first significant are each zeros and a second state if the $2^{(I-3)}$ significant bits of said first significant is non-zero; and wherein
said arithmetic logic unit is coupled to a temporary storage location, said arithmetic logic unit initially setting the temporary storage location to zero, then modifying said temporary location based upon the state of the plurality of flags, and finally modifying said first exponent based on the contents of said temporary location.

13. The circuit of claim 12, wherein said temporary storage location is a register in a register file.

14. The circuit of claim 12, wherein said temporary storage location is a main memory accessed through a memory interface.

15. The circuit of claim 12 wherein said arithmetic logic unit modifies the first exponent by subtracting the contents of said temporary location from said first exponent.

16. The circuit of claim 12, wherein I is equal to 3.

17. A massively parallel processing system, comprising:
a main memory;
an array of processing elements, each processing element of the array being coupled to said main memory and other processing elements of said array, wherein each of said processing elements comprises,
a first register block, said first register block including at least one first register for holding a first exponent and a first significant of a first floating point number and a first logic capable of left shifting the significant of the first floating point number;
a second register block, said second register block including at least one second register for holding a second exponent and a second significant of a second floating point number;
a plurality of flags, each of said plurality of flags having a state based on the contents of said first significant;
an arithmetic logic unit coupled to said first register block, said second register block, and said plurality of flags, said arithmetic logic unit causing the first logic to left shift the first significant based upon the states of said plurality of flags.

18. The massively parallel processing system of claim 17, wherein said plurality of flags further comprises:
an $I^{th}$ flag, wherein I is a non-negative integer, said $I^{th}$ flag which is set to a first sate when the $2^I$ most significant bits of said first significant are each zeros and a second state if any of the $2^I$ most significant bits is non-zero.

19. The massively parallel processing system of claim 18, wherein said arithmetic logic unit causes said first logic to left shift by $2^I$ bits the first significant if said $I^{th}$ flag is set to the first state.

20. The massively parallel processing system of claim 19, wherein said arithmetic logic unit is coupled to a temporary storage location for storing an adjustment to be subtracted from said first exponent, and increments said adjustment by $2^I$ if said first flag is set to the first state.

21. The massively parallel processing system of claim 18, wherein I is 0.

22. The massively parallel processing system of claim 18, wherein I is 1.

23. The massively parallel processing system of claim 18, wherein I is 2.

24. The massively parallel processing system of claim 18, wherein I is 3.

25. The massively parallel processing system of claim 18, wherein I is equal to 3.

26. The massively parallel processing system of claim 17, wherein said arithmetic logic unit is coupled to a temporary storage location.

27. The massively parallel processing system of claim 26, wherein said temporary storage location is a register in a register file.

28. The massively parallel processing system of claim 26, wherein said temporary storage location is a main memory accessed through a memory interface.

29. The massively parallel processing system of claim 17, wherein:
said plurality of flags further comprises,
an $I^{th}$ flag, wherein I is a positive integer of at least 3, which is set to a first state when the $2^I$ most significant bits of said first significant are each zeros and a second state if any of the $2^I$ most significant bits of said first significant is on-zero;
a $(I-1)^{th}$ flag which is set to a first state when the $2^{(I-1)}$ most significant bits of said first significant are each zeros and a second state if any of the $2^{(I-1)}$ most significant bits of said first significant is non-zero;
a $(I-2)^{th}$ flag which is set to a first state when the $2^{(I-2)}$ most significant bits of said first significant are each zeros and a second state if any of the $2^{(I-2)}$ most significant bits of said first significant is non-zero; and a $(I-3)^{th}$ flag which is set to a first state when the $2^{(I-3)}$ most significant bits of said first significant are each zeros and a second state if the $2^{(I-3)}$ significant bits of said first significant is non-zero; and wherein said arithmetic logic unit is coupled to a temporary storage location, said arithmetic logic unit initially setting the temporary storage location to zero, then modifying said temporary location based upon the state of the plurality of flags, and finally modifying said first exponent based on the contents of said temporary location.

30. The massively parallel processing system of claim 29, wherein said temporary storage location is a register in a register file.

31. The massively parallel processing system of claim 29, wherein said temporary storage location is a main memory accessed through a memory interface.

32. The massively parallel processing system of claim 17 wherein said arithmetic logic unit modifies the first exponent by subtracting the contents of said temporary location from said first exponent.

33. A method for normalizing the significant of a floating point number stored in a processing element having an exponent register, a plurality of significant registers, an $I^{th}$ flag indicating whether the $2^I$ most significant bits of the significant are each zero, a $(I-1)^{th}$ flag indicating whether the $2^I$ most significant bits of the significant are each zero, a $(I-2)^{th}$ flag indicating whether the $2^{(I-2)}$ most significant bits of the significant are each zero, a $(I-3)^{th}$ flag indicating whether the $2^{(I-3)}$ most significant bit of the significant is zero, and a temporary variable, wherein I is an integer of at least 3, said method comprising the step of:

(a) initializing the temporary variable to zero;
(b) if said $I^{th}$ flag is set, left shifting the significant by $2^I$ bits and incrementing the temporary variable by $2^I$;
(c) if said $(I-1)^{th}$ flag is set, left shifting the significant by $2^{(I-1)}$ bits and incrementing the temporary variable by $2^{(I-1)}$;
(d) if said $(I-2)^{th}$ flag is set, left shifting the significant by $2^{(I-2)}$ bits and incrementing the temporary variable by $2^{(I-2)}$;
(e) if said $(I-3)^{th}$ flag is set, left shifting the significant by $2^{(I+3)}$ bit and incrementing the temporary variable by $2^{(I-3)}$; and
(f) decrementing the exponent register by the value of the temporary variable.

34. The method of claim 33, wherein I is equal to 3.

35. The method of claim 34, wherein step (d) is performed after step (c).

36. The method of claim 33, wherein step (a) is performed before step (b).

37. The method of claim 36, wherein step (e) is performed after step (d).

38. The method of claim 33, wherein step (c) is performed after step (b).

39. The method of claim 38, wherein step (f) is performed after step (e).

* * * * *

UNITED STATES PATENT AND TRADEMARK OFFICE
CERTIFICATE OF CORRECTION

PATENT NO. : 6,981,012 B2
APPLICATION NO. : 09/874044
DATED : December 27, 2005
INVENTOR(S) : Graham Kirsch It is certified that error appears in the above-identified patent and that said Letters Patent is hereby corrected as shown below:

In the Specification, the following errors are corrected:

Column 2, line 46, "significand" should read --significant--;

Column 2, line 49, "significand" should read --significant--;

Column 2, line 56, "significand" should read --significant--;

Column 2, line 60, "significand" should read --significant--;

Column 2, line 63, "number" should read --numbers--;

Column 2, line 64, "significands" should read --significants--;

Column 2, line 65, "significand" should read --significant--;

Column 2, line 67, "significands" should read --significants--;

Column 3, line 2, "significand" should read --significant--;

Column 3, lines 14-15, "significands" should read --significants--;

Column 4, line 14, "optional a G" should read --optional G--;

Column 4, line 29, "significand" should read --significant--;

Column 4, line 31, "significand" should read --significant--;

Column 4, line 44, "an bus" should read --a bus--;

Column 4, line 47, "include" should read --includes--;

Column 4, line 60, "contain" should read --contains--;

Column 4, line 62, "conditions" should read --condition--;

UNITED STATES PATENT AND TRADEMARK OFFICE
CERTIFICATE OF CORRECTION

| | | |
|---|---|---|
| PATENT NO. | : 6,981,012 B2 | |
| APPLICATION NO. | : 09/874044 | |
| DATED | : December 27, 2005 | |
| INVENTOR(S) | : Graham Kirsch | |

It is certified that error appears in the above-identified patent and that said Letters Patent is hereby corrected as shown below:

Column 4, line 67, "one if the" should read --one of the--;

Column 5, line 2, "one if the" should read --one of the--;

Column 5, line 15, "significand" should read --significant--;

Column 5, line 24, "significands" should read --significants--;

Column 5, line 37, "significand" should read --significant--;

Column 5, line 39, "significand" should read --significant--;

Column 5, line 42, "significand" should read --significant--;

Column 5, line 44, "significand" should read --significant--;

Column 5, line 45, "significand" should read --significant--;

Column 5, line 47, "significand" should read --significant--;

Column 6, line 2, "1-bits" should read --1-bit--;

Column 6, line 36, "zero so no" should read --zero no--;

Column 8, line 2, "an floating" should read --a floating--;

Column 8, line 11, "significand" should read --significant--;

Column 8, line 16, "significand" should read --significant--;

Column 8, line 20, "significand" should read --significant--; and

Column 8, line 34, "significand" should read --significant--.

UNITED STATES PATENT AND TRADEMARK OFFICE
CERTIFICATE OF CORRECTION

PATENT NO. : 6,981,012 B2
APPLICATION NO. : 09/874044
DATED : December 27, 2005
INVENTOR(S) : Graham Kirsch It is certified that error appears in the above-identified patent and that said Letters Patent is hereby corrected as shown below:

In the Claims, the following errors are corrected:

Claim 2, column 9, line 4, "sate" should read --state--; and

Claim 18, column 10, line 20, "sate" should read --state--.

Signed and Sealed this

Twenty-fifth Day of December, 2007

JON W. DUDAS
*Director of the United States Patent and Trademark Office*